(12) United States Patent
Gut

(10) Patent No.: US 10,618,459 B2
(45) Date of Patent: Apr. 14, 2020

(54) PROVIDING A LIGHTING FUNCTION FOR ASSISTING A DRIVER WHEN DRIVING A MOTOR VEHICLE

(71) Applicant: AUDI AG, Ingolstadt (DE)

(72) Inventor: Carsten Gut, Überlingen (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/491,719

(22) PCT Filed: Mar. 5, 2018

(86) PCT No.: PCT/EP2018/055312
§ 371 (c)(1),
(2) Date: Sep. 6, 2019

(87) PCT Pub. No.: WO2018/162392
PCT Pub. Date: Sep. 13, 2018

(65) Prior Publication Data
US 2020/0079279 A1 Mar. 12, 2020

(30) Foreign Application Priority Data
Mar. 7, 2017 (DE) .................. 10 2017 203 717

(51) Int. Cl.
H05B 45/00 (2020.01)
B60Q 1/14 (2006.01)
B60K 35/00 (2006.01)

(52) U.S. Cl.
CPC .............. B60Q 1/143 (2013.01); B60K 35/00 (2013.01); B60K 2370/1529 (2019.05);
(Continued)

(58) Field of Classification Search
CPC ........ H05B 37/02; H05B 33/08; H05B 45/00; H05B 45/10; H05B 47/00; H05B 47/10;
(Continued)

(56) References Cited

U.S. PATENT DOCUMENTS

2014/0309864 A1* 10/2014 Ricci .................... A61B 5/0077
701/36

FOREIGN PATENT DOCUMENTS

DE 10 2005 026 684 A1 1/2006
DE 10 2006 050 546 A1 4/2008
(Continued)

OTHER PUBLICATIONS

Translation of the International Preliminary Report on Patentability dated Oct. 3, 2019 from International Patent Application No. PCT/EP2018/055312, 7 pages.
(Continued)

Primary Examiner — Jimmy T Vu
(74) Attorney, Agent, or Firm — Staas & Halsey LLP

(57) ABSTRACT

A lighting function for assisting a driver when driving a motor vehicle is provided by activating the lighting function, determining a light distribution according to the lighting function, determining a perspective of a driver of the motor vehicle and controlling a projection device of the motor vehicle in such a way that the projection device outputs light according to light distribution. Topography data from an environment in a field of view of the driver and/or object data from an object in the surroundings in the field of view of the driver are acquired, and the light distribution is determined as a function of the topography data and/or object data and the perspective of the driver.

20 Claims, 1 Drawing Sheet

(52) U.S. Cl.
CPC .. *B60K 2370/167* (2019.05); *B60K 2370/334* (2019.05); *B60K 2370/52* (2019.05); *B60Q 2300/054* (2013.01); *B60Q 2300/23* (2013.01); *B60Q 2300/30* (2013.01); *B60Q 2300/40* (2013.01); *B60Q 2400/50* (2013.01)

(58) Field of Classification Search
CPC .............. B60Q 1/143; B60Q 2300/054; B60Q 2300/23; B60Q 2300/30; B60Q 2300/40; B60Q 2400/50; B60K 2370/1529; B60K 2370/167; B60K 2370/52; B60K 2370/334
See application file for complete search history.

(56) References Cited

FOREIGN PATENT DOCUMENTS

| | | |
|---|---|---|
| DE | 10 2006 050 547 A1 | 4/2008 |
| DE | 10 2009 048 619 A1 | 6/2010 |
| DE | 10 2013 203 925 A1 | 9/2014 |
| DE | 10 2013 104 276 A1 | 10/2014 |
| DE | 10 2013 016 250 A1 | 4/2015 |
| DE | 10 2014 000 935 A1 | 7/2015 |
| DE | 10 2014 013 165 A1 | 3/2016 |
| DE | 10 2016 000 838 A1 | 8/2016 |
| DE | 10 2017 203 717.2 | 3/2017 |
| EP | 1 916 153 A2 | 4/2008 |
| EP | 2 896 937 A1 | 7/2015 |
| EP | 3 135 537 A1 | 3/2017 |
| FR | 2 967 625 A1 | 5/2012 |
| WO | PCT/EP2018/055312 | 3/2018 |

OTHER PUBLICATIONS

International Search Report for PCT/EP2018/055312 dated Jun. 6 2018, 3 pages.
German Office Action for German Application No. 10 2017 203 717.2 dated Oct. 12, 2017, 7 pages.

\* cited by examiner

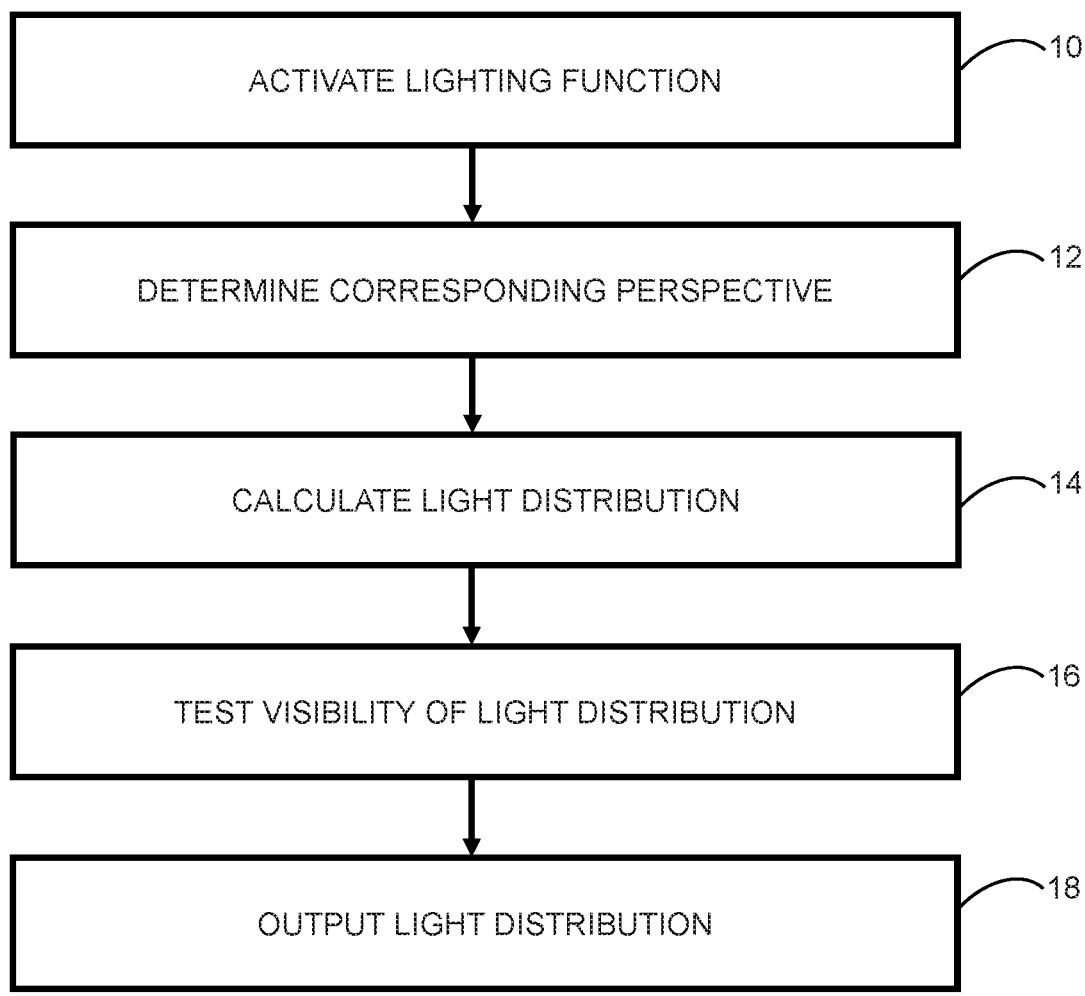

PROVIDING A LIGHTING FUNCTION FOR ASSISTING A DRIVER WHEN DRIVING A MOTOR VEHICLE

CROSS REFERENCE TO RELATED APPLICATIONS

This application is a U.S. national stage of International Application No. PCT/EP2018/055312, filed on Mar. 5, 2018. The International Application claims the priority benefit of German Application No. 10 2017 203 717.2 filed on Mar. 7, 2017. Both the International Application and the German Application are incorporated by reference herein in their entirety.

BACKGROUND

Described herein is a method for providing a lighting function for assisting a driver when driving a motor vehicle, in which the lighting function is activated, a light distribution is determined according to the lighting function, a perspective of a driver of the motor vehicle is determined, and a projection apparatus of the motor vehicle is controlled in such a way that the projection apparatus outputs light according to the light distribution. Also described herein is a device for providing a lighting function for assisting a driver when driving a motor vehicle, wherein the device activates the lighting function on the basis of reception of an activation signal which is assigned to the lighting function, determines a light distribution according to the lighting function, determines a perspective of a driver of the motor vehicle, and includes a control unit for providing a control signal for controlling the projection apparatus of the motor vehicle, so that the projection apparatus outputs light according to the light distribution. Furthermore, also described herein is a motor vehicle which includes the device.

Methods and devices of the generic type as well as also motor vehicles with such devices are extensively known. They serve to provide a lighting function which serve, for example, for illuminating a route or a road on which the motor vehicle is being driven by the driver, or else to provide signals which can be sensed visually by the driver. In this context, for example German patent application publication 10 2016 00 838 A1 describes a method and a control unit for facilitating the positioning of a vehicle. This teaching is aimed, in particular, at improving a lateral positioning of the motor vehicle, in order as a result to improve improved positioning to an energy transmission segment, arranged in a roadway, of a road in the direction of travel of the motor vehicle, so that energy transmission is improved. The energy transmission segment is based on providing, by using an alternating magnetic field, energy which can be fed to the motor vehicle by extracting energy from the alternating field by using a suitable energy coupler. So that usable energy coupling can be achieved, it is necessary to orient the motor vehicle as precisely as possible with respect to the energy transmission segment. For this purpose, lateral boundaries of the energy transmission segment in front of the motor vehicle are determined. In addition, a deviation of the determined lateral position of the motor vehicle from the fixed lateral boundaries of the energy transmission segment is determined. A process for facilitating the lateral positioning of the motor vehicle within the lateral boundaries is then carried out so that the driver is assisted in keeping the motor vehicle within the lateral boundaries of the energy transmission segment. For this purpose a sign or symbol is correspondingly displayed in a headup display (HUD). Furthermore, a corresponding sign can be projected onto the roadway in front of the motor vehicle in order to be able to direct the driver in a desired fashion.

Even if this known device has proven itself, there are nevertheless disadvantages. Contemporary headlights and HUDs are used to form corresponding light distributions or lighting functions independently of topography. This can lead to a situation in which the visual formation for the driver is not always sufficiently clear. This can result in incorrect directing operations.

SUMMARY

An aspect of the disclosure relates to improving the provision of the lighting function for assisting the driver when driving the motor vehicle.

Aspects of the disclosure relate to a method, a device and a motor vehicle according to the independent claims.

Advantageous developments emerge from features of the dependent claims.

With respect to a method of the generic type, it is proposed for example that topography data from surroundings in a field of vision of the driver and/or object data from an object in the surroundings in the field of vision of the driver are determined, and the light distribution is determined as a function of the topography data and/or object data and the perspective.

With respect to a device of the generic type, it is proposed for example that the device determines topography data from surroundings in a field of vision of the driver and/or object data from an object in the surroundings in the field of vision of the driver, and wherein the device which determines the light distribution is designed to determine the light distribution as a function of the topography data and/or object data and the perspective.

With respect to the motor vehicle it is proposed, for example, that the motor vehicle includes the device.

Aspects of the disclosure are based on the concept that by taking into account the topography and/or object data in conjunction with the perspective it is possible to achieve an improved projection by the projection apparatus. In this context, the projection or formation can be equalized by taking into account topography data and/or object data in conjunction with the perspective, in such a way that a projection or formation which is basically without visual disruption for the driver can be obtained. The driver can therefore perceive the projection or the formation independently of the projection surface and the properties thereof. Even if the device is, of course, aimed particularly at the driver of the motor vehicle as a vehicle driver, the device can equally also be applied to a co-driver as a driver.

The activation of the lighting function can be carried out, for example, on the basis of a control command of the driver by the driver manually activating a pushbutton key, making a corresponding voice input, making a corresponding gesture input and/or the like. However, it is also possible to bring about activation by using a motor vehicle controller which, for example owing to a state of the motor vehicle and/or the surroundings of the motor vehicle, would like to make a corresponding output to the driver. Thus, for example, a recommendation to turn off or the like can be output. The turn-off recommendation can be activated, for example, by a navigation system of the motor vehicle.

It is possible to predefine a multiplicity of corresponding lighting functions so that only a single, for example digital, control signal is required to activate the respective lighting function. It is therefore possible, for example, for at least one lighting function to be assigned a light distribution which is stored, for example, in a file. The respective lighting function can be assigned a uniquely defined corresponding light distribution which is then made available visually in an automatic fashion by the projection apparatus. The light distribution can include not only signs, for example symbols, but also visual highlighting of specific regions of the field of vision and/or the like.

The device utilizes the determination of a perspective of the driver of the motor vehicle. For this purpose one or more corresponding sensors can be arranged on the vehicle, for example in the region of a position of the driver, and can be used to sense a position of the head, for example a position of the eyes, for example an orientation of an eye. A vertical position and orientation of a field of vision of the driver with respect to a vehicle longitudinal axis of the motor vehicle can also be determined.

According to the disclosure, topography data are also determined from the surroundings in a field of vision of the driver. The data can serve to adjust the light distribution of the lighting function correspondingly so that a formation of the light distribution which is basically not distorted from the driver's point of view can be realized taking into account the topography data. For this purpose, it is alternatively or additionally also possible to determine object data of an object in the surroundings in the field of vision of the driver. This makes it possible to make available the projection and/or the formation in a basically non-distorted fashion for the driver. Furthermore, the device permits sight-impeding topographies or objects to be integrated into the light distribution in such a way that they do not significantly adversely affect the projection or formation from the driver's point of view. As a result, a reliable projection or formation can be obtained even under unfavorable boundary conditions, for example topographies or objects. In addition to this, the determined perspective of the driver can then be taken into account in order to improve further equalization of the formation. It is therefore possible for the device to realize a projection or formation which can be sensed visually by the driver and which occurs basically without distortion and while taking into account the determined topography and/or objects.

The projection apparatus can be provided at least by using a headlight of the motor vehicle. The headlight is designed to provide a light distribution which corresponds to the lighting function and is controlled with a corresponding signal of the control unit. In response to this the light output is set according to the light distribution in such a way that the light which is output by the headlight is projected onto a projection surface, for example the route or the roadway, so that it can be sensed visually by the driver. For this purpose, the light is for example output in a region on the roadway in the direction of travel in front of the motor vehicle which can usually be seen well by the driver during the correct driving operation of the motor vehicle.

The headlight is for example a pixel headlight. A pixel headlight is a headlight which has a multiplicity of pixels which can for example output light individually. The light output of the individual pixels can be controlled by using the headlight controller. The pixels of the pixel headlight are for example arranged in the manner of a matrix. A pixel is generally formed by a light element which can be controlled individually with respect to its light output by the headlight controller. The control of the light elements can be carried out individually basically independently of one another, so that virtually any desired light distributions can be provided by using the pixel headlight. Therefore, a highly flexible light distribution with respect to the light output of the pixel can be achieved. The light element can be, for example, a light emitting diode, a laser diode, but basically also a glow lamp, a gas discharge lamp, combinations thereof or the like. Moreover, the pixels of the pixel headlight can also be provided by a luminescent material which can be activated by using a laser light beam of a laser light source to output light in a punctiform and/or linear fashion. In this case, the conversion material provides the pixels of the pixel headlight. In the case of such a headlight there can also be provision that the pixels merge within one another virtually without boundaries, for example owing to a corresponding actuation by the laser. Such a headlight is also referred as a laser scanner.

Furthermore, the projection apparatus can, however, also include a headup display apparatus. A headup display apparatus, also referred to as headup display (HUD), is a display apparatus in which a user, here the driver of the motor vehicle, can maintain the position of his head or his viewing direction during correct operation of the motor vehicle, for example when driving the motor vehicle, because the information which is projected into his field of vision according to the light distribution is projected into the field of vision of the driver in such a way that he can maintain his perspective, as selected for driving the motor vehicle, basically without modification. The HUD usually uses a front window or windshield of the motor vehicle, at least in the region of the driver's position, for corresponding projection or formation. A HUD is therefore occasionally also referred to as a front windshield projector. A HUD as a projection apparatus includes not only a projection unit which provides a corresponding light distribution, but also a correspondingly controllable light source and an optics unit. By using the optics unit the light which is output by the light source is directed correspondingly onto a projection surface, for example the front window of the motor vehicle, according to the light distribution. HUDs are therefore display apparatuses with an imaging projection unit for projecting a virtual image, that is to say graphic information, in a beam path onto a reflection surface in a passenger compartment of the motor vehicle which is generally provided by the windshield or the front window of the motor vehicle.

The disclosure makes use of the realization that a calculation for the projection apparatus can for example be made independently of the actual configuration of the projection apparatus. That is to say the calculation of the light distribution which is assigned to the lighting function can be used both for a projection by using a headlight and for a projection on the HUD. The calculation for this can also be basically even identical. In this context, all that is necessary is to take into account a different position of the HUD with respect to any headlight. However, this can be done by simple adjustment by using one or more parameters and/or the like. All that needs to be taken into account is that architecture of the HUD and/or of the headlight have to be suitably made available. The architecture is to be selected, of course, in such a way that a light distribution can also be formed according to the lighting function with a specified resolution. For example, a resolution of up to approximately 1 million pixels or even more can be provided. The projection apparatus can therefore be an HUD and/or a headlight. Both the HUD and the headlight are correspondingly designed to form the light distribution, corresponding in the lighting function, in such a way that it can be suitably sensed visually by the driver.

There is for example provision that the light distribution is determined as a function of visibility conditions. The visibility conditions are visual properties of the surroundings, for example of an atmosphere which surrounds the motor vehicle and which can adversely affect the visibility of the projection for the driver, for example fog, rain, snow or else ambient brightness, light of external light sources, for example oncoming motor vehicles and/or motor vehicles traveling ahead and/or the like. This can be additionally taken into account in the determination of the light distribution.

According to one development it is proposed that the projection apparatus is controlled in such a way that the light distribution is provided independently of orientation of the motor vehicle with respect to a surface of a route on which the motor vehicle is being driven. As a result, for example different properties of the route, for example relating to a surface of the route, can be taken into account. It is therefore possible, for example, to take into account reflection properties, for example if the route has increased reflection owing to wetness, or if taking into account different properties relating to the formation owing to a type of roadway covering, for example asphalt, cobblestones and/or the like.

There is for example provision that the perspective is adjusted by the driver and/or as a function of vehicle data of the motor vehicle in an automated fashion. It is therefore possible for the driver to perform corresponding adjustment of the perspective by using a, for example, manual input, so that a projection which can be sensed better visually by him can be made by using the projection apparatus. However, this can also be done in an automated fashion and as a function of vehicle data of the motor vehicle, for example if the driver changes his perspective owing to a current driving situation and this is sensed by using the sensors which are provided for this purpose. However, it is also possible to provide that a corresponding adjustment is performed in an automated fashion on the basis of vehicle data of the motor vehicle which are present when the motor vehicle is being controlled, for example as a function of a velocity, changing of a roadway covering, or other properties which are sensed by using suitable sensors and/or the like.

According to one development it is proposed that the projection apparatus includes at least two pixel headlights, and the pixel headlights are controlled in such a way that the light distribution is provided by the headlights superimposing the light output. As a result it is possible to utilize an increased projection surface because with two pixel headlights it is possible to obtain a correspondingly improved, for example enlarged, formation. Furthermore, it is, of course, possible that a greater brightness, a greater contrast and/or the like can be provided for the projection by using the headlights. This is advantageous, for example, if the ambient brightness is very high and if a projection with merely a single pixel headlight were only be able to be perceived visually by the driver with difficulty owing to low contrast. The use of two headlights for forming the light distribution can also be advantageous for other reasons, for example if weather properties such as rain, snow or the like disrupt a corresponding projection onto the route, for example the roadway, and/or the like.

The projection apparatus for example includes at least one headup display apparatus, wherein the headup display apparatus is controlled in such a way that the light distribution is provided by the headup display apparatus. The headup display apparatus for example makes it possible to provide a corresponding projection for the driver of the motor vehicle on a corresponding projection surface, for example a reflection surface, for example a windshield of the motor vehicle. Since the visibility of the driver also depends on further properties of the field of vision, the corresponding control proves particularly advantageous. Therefore, it is not only possible to adjust a contrast and/or brightness in an automatic fashion but also to adjust specific regions of the formation or of the projection with respect to the formation in such a way that improved visibility can be realized even when there is an unfavorable background, for example if a visually unfavorable object, such as a building or the like, which would disrupt the visibility of the projection for the driver is present in the field of vision of the driver. As a result, improved visual perception can be achieved by the driver.

The projection apparatus can therefore include, for example, at least one headlight and at least one HUD.

Furthermore, it is proposed that a light distribution, which projects beyond a display area of the headup display apparatus, is formed at least partially by at least one of the pixel headlights. This configuration is suitable, for example, for forming large-area projections, for the formation of which the headup display apparatus alone would not be sufficient. With the disclosure it is easily possible, owing to common calculation of the formation for the headlight and for the headup display apparatus, to achieve a common projection or formation and to provide an improved projection surface utilizing both formation possibilities. As a result it is possible to make available a light distribution with a higher resolution so that an improved graphic formation can be made available to the driver. In this context there may for example be provision that the formations by the headlight at least partially intersect the headup display apparatus. However, there can also be provision that they adjoin one another and an overlap is basically not provided. At the same time, the disclosure can ensure that a virtually seamless common formation can be obtained for visual sensing by the driver.

Furthermore it is proposed that switching over occurs between a formation of the light distribution by at least one of the pixel headlights and a formation of the light distribution by the headup display apparatus. This configuration is suitable, for example, for the case in which a formation by using the headlight is not possible owing to a current lighting requirement. In this case, the headup display apparatus is for example used for the formation. Otherwise, it can also be conversely provided that the headup display apparatus is used for a driver-specific projection, for example for displaying motor data or the like, but if a further formation is desired or is to take place in an automated fashion, in order to be able to display a warning or a turnoff message or the like a selection option for the formation can also be made available to the driver so that the driver can, if necessary, select the desired projection surface. For example there may be provision that when there is high ambient brightness a formation on the headup display apparatus is provided, whereas in the case of darkness a formation occurs by using the headlight on the route or the roadway.

The effects and advantages which are specified for the method apply equally to the device and to the motor vehicle which is equipped with the device, and vice versa. Correspondingly, device features can also be formulated for method features, and vice versa.

The scope of the disclosure also includes developments of the method which have features such as have already been described in relation to the developments of the motor vehicle. For this reason, the corresponding developments of the method are not described here once more.

Example embodiments are described in the text which follows. The single drawing shows a schematic flow chart for a method procedure according to the disclosure. The method procedure permits distortion compensation for a projection apparatus which can be formed by an HUD and/or a headlight of a motor vehicle.

BRIEF DESCRIPTION OF THE DRAWING

These and other aspects and advantages will become more apparent and more readily appreciated from the following description of the example embodiments, taken in conjunction with the accompanying single drawing which illustrates a schematic flow chart for a method procedure according to the disclosure.

DETAILED DESCRIPTION

Reference will now be made in detail to example embodiments with reference to the accompanying drawing.

A lighting function is actuated in a first block 10. It is determined whether a lighting function is to be activated. The lighting function can be requested, for example, manually by activation of an activation element such as a push-button knob, a switching lever and/or the like, by using a voice input or else by using a gesture input by the driver of the motor vehicle. Furthermore, there is the possibility of providing automatic activation which occurs, for example, on the basis of vehicle data. For this purpose, a superordinate motor vehicle controller in which corresponding vehicle data are present can output a corresponding activation signal to a device.

The method procedure can be carried out with a device which can include, for example, an electronic hardware circuit and/or a computing unit. The computing unit can be suitably controlled by using a suitable computer program, in order to be able to provide the desired functionality. Of course, the hardware circuit and/or the computing unit can be at least partially embodied as an integrated semiconductor component. Furthermore, there is the possibility that the device is also embodied integrated at least partially into the superordinate motor vehicle controller.

According to a subsequent operation for the respective lighting function the corresponding perspective is determined in a block 12. For this purpose, a perspective of the driver is determined. For good compensation of any distortion during the formation of the respective lighting function or of the light distribution assigned to the lighting function, the perspective of the viewer, here of the driver of the motor vehicle, should be defined for the respective lighting function. There can be provision that the perspective is already fixedly assigned to a respective lighting function. However, there can alternatively also be provision that the perspective is adjusted manually by the driver or else adjusted in an automated fashion by the superordinate motor vehicle controller.

In a subsequent operation which is illustrated in block 14, the light distribution which is assigned to the lighting function is calculated. The calculation utilizes topography data and/or object data which determine the topography and/or objects in the field of vision of the driver or of the viewer by using suitable sensors. The topography can be formed, for example, by using terrain information and/or the like. Objects can be, for example, other road users, obstacles in the field of vision of the driver and also buildings as well as other structures and/or the like. The object data and/or the topography data are for example newly acquired on a regular basis, for example as a function of a respectively changing position of the motor vehicle owing to the correct driving operation.

Objects can be, for example, reference points which can be determined in global coordinates or the like. The light distribution can be adjusted to these objects. On the basis of this data it is therefore possible, for example, to exclude an oncoming vehicle and/or a vehicle traveling ahead and/or to include a lane. Furthermore, a projection formation can also be adjusted to a distance from a vehicle traveling ahead. Furthermore, it is possible to adjust the light distribution, for example on the basis of vehicle data, which can include, for example, parameters such as the steering angle, speed, direction of travel and/or the like.

The topography of a projection surface, for example a roadway of the route, a terrain located in the field of vision and/or the like, can be taken into account for correct distortion compensation. Apart from the road, the projection surface can basically also be another projection surface, for example a wall or the like. If, for example, a light distribution of a left-hand and a right-hand headlight of the motor vehicle is to be formed in a superimposed fashion, the quality of the topography can also be taken into account in the calculation in order to be able to bring about correct superimposition of the projections by the respective headlights.

Furthermore, a position of the head of the viewer, here of the driver, is particularly advantageously included. Furthermore it is possible to take into account tilting of the plane of projection, for example if the vehicle is carrying out movements itself owing to the correct driving operation, for example owing to rolling movements and/or pitching movements which can be caused by vehicle dynamics and/or road topography. This can also be used for the method procedure. With this data it is possible to ensure that the desired light distribution can for example be projected basically always at the same horizontal and vertical distance.

It proves advantageous here that the calculation can be used both for the formation by using headlights and for the formation by using HUD. Switching over can be implemented easily by virtue of the fact that a corresponding adjustment factor is taken into account which takes into account the different physical aspects of the headlight with respect to an HUD. In this respect, the method procedure can provide a control signal for the projection apparatus, which signal can be basically independent of the respective projection apparatus. This establishes a new field for applications with driver assistance.

In a subsequent operation, represented by a block 16, the visibility is tested, for example, for the driver. For the evaluation of the visibility of a respective light distribution it is possible to take into account a plurality of parameters. Therefore, the structure of the projection surface, which can depend, for example, on a degree of reflection and further reflection properties of the projection surface, can be taken into account. A further parameter can be the information as to whether the projection surface is wet or covered with snow or with ice. Depending on the quality of the surface a correspondingly output light intensity can be set. It is therefore also possible to ensure that a respective lighting function can no longer be formed, for example owing to the quality of the surface. This can occur, for example, when the surroundings are too bright and the intensity of the light distribution can no longer be increased. Furthermore, the traffic density can also be taken into account. If the traffic density is, for example, too high and a distance from other motor vehicles is continuously too low, there can also be provision that it is no longer possible to activate the lighting function or that a corresponding light distribution is not formed any more.

In a further operation, represented by a block 18, the output takes place. In this operation, the light distribution is output by the projection apparatus. Furthermore, there can be provision that the output is made in a way which is adapted to a respective projection apparatus which has been selected on the part of the vehicle and/or on the part of the superordinate vehicle controller. The respective projection apparatus can correspondingly be provided an adaptation here.

The method procedure is for example provided for continuous repetition. This can take into account, for example, the fact that during the use of the device the motor vehicle is in a specific driving mode and the corresponding data change as a function of a respective driving position of the motor vehicle. As a result it is possible to obtain a continued method procedure which, on the basis of the properties, permits improved assistance of the driver when he is driving the motor vehicle.

The disclosure additionally makes use, for example, of the concept that as a result of the common calculation in a control unit like the device it is possible to form a function interactively between different projection apparatuses such as the HUD and the headlight. For example, a turn off recommendation can be formed both in the HUD and by using the headlight. Furthermore it is possible for a function to be transferred from the HUD to the headlight and vice versa, for example if an angle of aperture of the HUD is exhausted and an extended formation can be realized by using the headlight.

Architecture of the HUD and of the headlight is correspondingly embodied in an adapted fashion.

The exemplary embodiments serve merely to explain the disclosure and are not restrictive.

The exemplary embodiments explained herein are example embodiments. In the example embodiments, the described components of the embodiments each represent individual features which are to be considered independently of one another and which each also develop the disclosure independently of one another and are therefore also to be considered as a component, either individually or in a combination other than that shown. Moreover, the described embodiments can also be supplemented by further features which have already been described.

Even if the device has been explained on the basis of the application with the driver, it should be clear to a person skilled in the art that the projection apparatus can, of course, also be set and controlled for another and/or further co-driver in the motor vehicle. The method therefore does not need to be limited to the driver as the driver of the motor vehicle. The driver can therefore also be a co-driver or any occupant of the vehicle. For this purpose, a suitable selection function can be provided which can be activated by the driver and/or the co-driver and, if appropriate, also by the vehicle controller.

The device also includes permanent or removable storage, such as magnetic and optical discs, RAM, ROM, etc. on which the process and data structures of the disclosure can be stored and distributed. The processes can also be distributed via, for example, downloading over a network such as the Internet. The device can output the results to a display device, readily accessible memory or another computer on the network.

A description has been provided with reference to example embodiments, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for providing a lighting function for assisting a driver when driving a motor vehicle having a projection apparatus, the method comprising:
   activating the lighting function;
   determining a perspective of the driver;
   determining topography data from surroundings in a field of vision of the driver and/or object data from an object in the surroundings in the field of vision of the driver;
   determining a light distribution according to the lighting function, according to the topography data and/or the object data, and according to the perspective, the light distribution including signs and visual highlighting of specific regions of the field of vision of the driver;
   controlling the projection apparatus to output light according to the light distribution as at least one of a projection or formation by using at least one headup display apparatus and at least one pixel headlight;
   controlling the at least one headup display apparatus to output light as a projection according to the light distribution; and
   controlling the at least one pixel headlight to output light according to the light distribution so as to project beyond a display area of the headup display apparatus.

2. The method as claimed in claim 1, wherein determining the light distribution is based on visibility conditions.

3. The method as claimed in claim 1, wherein controlling the projection apparatus comprises controlling the projection apparatus so that the light distribution is provided independently of an orientation of the motor vehicle with respect to a surface of a route on which the motor vehicle is being driven.

4. The method as claimed in claim 1, wherein the perspective is adjustable by the driver and/or automatically based on a function of vehicle data of the motor vehicle.

5. The method as claimed in claim 1, wherein the projection apparatus includes at least two pixel headlights, and the method further comprises controlling the at least two pixel headlights to output light in a superimposed fashion, according to the light distribution.

6. The method as claimed in claim 1, wherein the light distribution includes symbols.

7. A device for providing a lighting function for assisting a driver when driving a motor vehicle having a projection apparatus, the device comprising:
   at least one memory to store instructions; and
   at least one processor configured to execute the instructions stored in the at least one memory to:
      activate the lighting function based on an activation signal assigned to the lighting function,
      determine a perspective of the driver,
      determine topography data from surroundings in a field of vision of the driver and/or object data from an object in the surroundings in the field of vision of the driver, determine a light distribution according to the lighting function, according to the topography data and/or the object data, and according to the perspective, the light distribution including signs and visual highlighting of specific regions of the field of vision of the driver, control the projection apparatus to output light according to the light distribution as at least one of a projection or formation by using at least one headup display apparatus and at least one pixel headlight,
control the at least one headup display apparatus to output light as a projection according to the light distribution, and
control the at least one pixel headlight to output light according to the light distribution so as to project beyond a display area of the headup display apparatus.

8. The device as claimed in claim 7, wherein the at least one processor is configured to determine the light distribution based on visibility conditions.

9. The device as claimed in claim 7, wherein the at least one processor is configured to control the projection apparatus so that the light distribution is provided independently of an orientation of the motor vehicle with respect to a surface of a route on which the motor vehicle is being driven.

10. The device as claimed in claim 7, wherein the at least one processor is configured to adjust the perspective based on a manual input by the driver and/or automatically based on a function of vehicle data of the motor vehicle.

11. The device as claimed in claim 7, wherein when the projection apparatus includes at least two pixel headlights, the at least one processor is configured to control the at least two pixel headlights to output light in a superimposed fashion, according to the light distribution.

12. The device as claimed in claim 7, wherein the light distribution includes symbols.

13. The device as claimed in claim 7, wherein the at least one processor is configured to test a visibility of the light distribution based on at least one of a reflection property of a projection surface onto which the light distribution is to be projected, an environmental condition of the projection surface, or a traffic density surrounding the motor vehicle.

14. A motor vehicle, comprising:
a projection apparatus including at least one headup display apparatus and at least one pixel headlight; and
the device of claim 7.

15. The motor vehicle as claimed in claim 14, wherein the at least one processor is configured to determine the light distribution based on visibility conditions.

16. The motor vehicle as claimed in claim 14, wherein the at least one processor is configured to control the projection apparatus so that the light distribution is provided independently of an orientation of the motor vehicle with respect to a surface of a route on which the motor vehicle is being driven.

17. The motor vehicle as claimed in claim 14, wherein the at least one processor is configured to adjust the perspective based on a manual input by the driver and/or automatically based on a function of vehicle data of the motor vehicle.

18. The motor vehicle as claimed in claim 14, wherein
the projection apparatus includes at least two pixel headlights, and
the at least one processor is configured to control the at least two pixel headlights to output light in a superimposed fashion, according to the light distribution.

19. The motor vehicle as claimed in claim 14, wherein the light distribution includes symbols.

20. The motor vehicle as claimed in claim 14, wherein the at least one processor is configured to test a visibility of the light distribution based on at least one of a reflection property of a projection surface onto which the light distribution is to be projected, an environmental condition of the projection surface, or a traffic density surrounding the motor vehicle.

* * * * *